Figure 4:
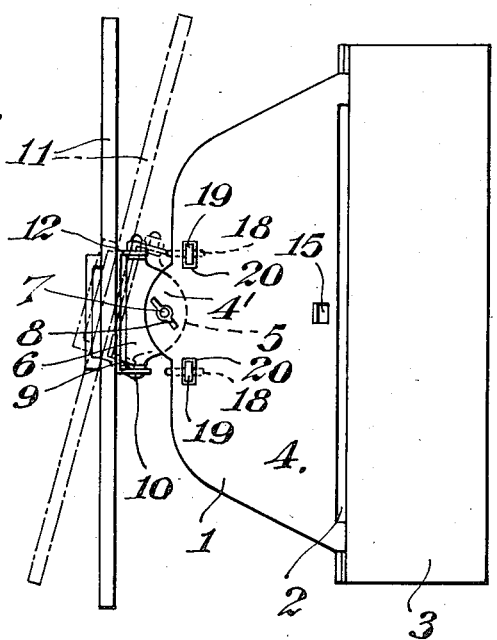

April 8, 1952     H. S. VINEY     2,592,086
MEANS ADJUSTABLY SUPPORTING A MIRROR
FROM A CABINET OR OTHER BASE MEMBER
Filed Dec. 8, 1947     2 SHEETS—SHEET 1
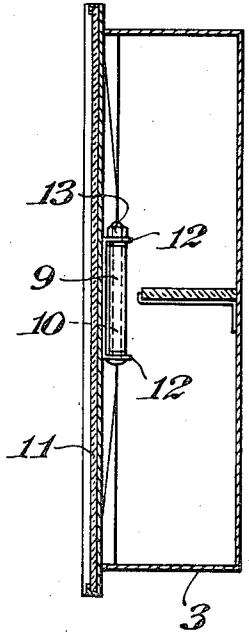
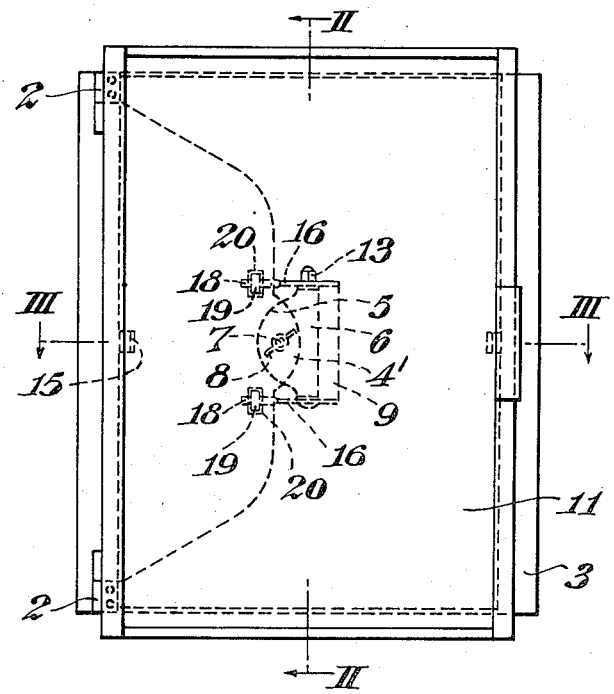
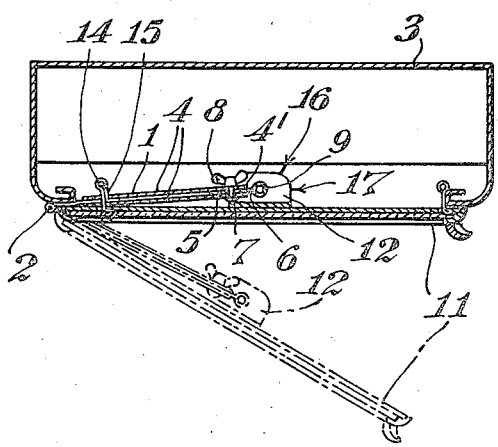
INVENTOR
HARRY S. VINEY April 8, 1952

H. S. VINEY 2,592,086

MEANS ADJUSTABLY SUPPORTING A MIRROR
FROM A CABINET OR OTHER BASE MEMBER

Filed Dec. 8, 1947

2 SHEETS—SHEET 2

INVENTOR
HARRY S. VINEY

Patented Apr. 8, 1952

2,592,086

UNITED STATES PATENT OFFICE 2,592,086

MEANS ADJUSTABLY SUPPORTING A MIRROR FROM A CABINET OR OTHER BASE MEMBER

Harry Stanley Viney, Kingston-on-Thames, England

Application December 8, 1947, Serial No. 790,390
In Great Britain January 6, 1947

2 Claims. (Cl. 88—96)

1

This invention relates to an adjustable support for a mirror or other object required to be held projecting from a base member, such as a cabinet, wall fitting or wall per se, and has particular application to bathroom cabinets or other like wall fittings inasmuch as it provides simple and effective means for supporting a mirror in such a manner as to enable same to be moved bodily outwards from the wall fitting, so as to take up a convenient position for use and by virtue of appropriate connection with its support it can be used in the manner of a hingedly mounted member, e. g. as the door of a cabinet to give access to the contents thereof, the supporting means also being such as will allow the mirror when turned about a vertical axis with respect to the support to be tilted about a horizontal axis so as to suit individual requirements. It is the particular feature of the invention that from any tilted position relative to the support, the mirror may be restored to a predetermined position (normal) for interaction with the support so that it will be centralised automatically to take up a correct position for housing in its appropriate socket in the wall or fitting, e. g. the front of the cabinet when the mirror acts as the door. While the interaction of the support and mirror in the predetermined position may be of a frictional character, more effective operation is ensured if this interaction is a definite lock and accordingly, the invention further provides for locking the mirror automatically to the support when said mirror is brought to normal position so that when next brought out for use it will function as a part of the support (which will usually be a simple hinged member) until unlocked from the support for swinging and tilting movement independently thereof.

According to the invention there is provided an adjustable support for a mirror or other object required to be held projecting from a base member, such as a cabinet, wall fitting or wall, comprising a support arm, a universal joint providing tilting as well as rotational adjustment of the object relative to the support arm, and a device operative to guide the object to a predetermined position with respect to the support arm as the object is moved towards that position from any tilted position.

Preferably a locking device is provided by which the object is automatically locked to the support arm as it reaches said predetermined position.

As the invention is particularly designed for application to a mirror fitting as incorporated

2 usually in the door of a bathroom cabinet, the following description will in general refer to a mirror support but it should be understood that where the content permits analogous applications of the invention are not excluded thereby.

According to the invention, therefore, there is provided a means for supporting a mirror from a wall fitting, cabinet or other base member, said means comprising a linkage which is hinged to the base member so as to be capable of turning about a vertical axis and which carries the mirror, the mirror being capable of angular movement about a vertical axis with respect to said linkage and also capable of tilting movement about a horizontal axis when at an angular position with respect to said linkage, co-operating elements on the back of the mirror and on the linkage for restoring the mirror to non-tilted position as it is brought into parallel relationship with the linkage, and a lock for locking the mirror automatically to said linkage when it has been brought to such parallel position.

In a convenient form of the invention the mirror support comprises a primary linkage member hinged to the base member so as to turn about a vertical axis to enable the mirror to be swung outwards away from and inwards towards said base member, and a secondary linkage member fulcrumed on said primary member for tilting adjustment movement with respect thereto about a horizontal axis and which is hingedly connected to the mirror for movement of said mirror about a vertical axis with respect to said secondary linkage member, co-operating elements provided on the back of the mirror and on the primary linkage member for restoring the secondary linkage member and mirror to a non-tilted position as the mirror is brought into parallel relationship with the primary and secondary linkage, and a lock for locking the mirror automatically to said linkage when it has been brought to such parallel position.

It will be observed that the word "tilted" where used in this specification implies angular movement about a horizontal axis.

Conveniently, the co-operating elements for restoring the mirror to a non-tilted position may comprise co-operating abutments provided on the mirror back and linkage and having a cam action. Devices of this form will be provided both above and below the axis of tilt if the mirror is capable of being tilted both upwardly and downwardly.

Figure 5:
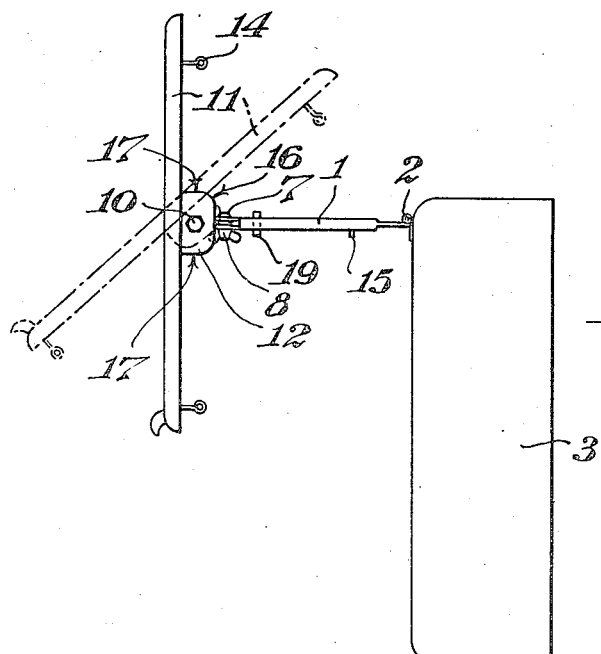

In order that the invention may be readily understood and carried into effect, reference will now be made to the accompanying drawings which show the invention applied to a usual form of bathroom or dressing cabinet and in which:

Figure 1 is a front view of the cabinet closed, the general arrangement of the adjustable mirror support according to the invention being shown in dotted lines since it is disposed at the back of the mirror, Figure 2 is a section on the line II—II of Figure 1 and shows more particularly the pivot joint between the back of the mirror and secondary link by which the mirror, when opened out from the cabinet, can be adjusted about a vertical axis, when it is not tilted, or more generally the axis which is at right angles to the tilting axis comprised in the joint between secondary link and primary link or support arm, Figure 3 is a section on the line III—III of Figure 1, the dotted lines showing the mirror locked to the primary link or support arm to form a unit as it will be in the closed position shown in full lines, in an opened-out position before it is unlocked from the primary link, Figure 4 is an elevation looking from one side of the cabinet with the mirror door opened-out therefrom, and the mirror unlocked from the primary link and adjusted to a vertical position at right angles to the primary link, the dotted lines showing one of its tilted positions, Figure 5 is a plan looking down on the cabinet with the mirror door opened out as in Figure 4, but the dotted lines showing the mirror in one of its adjusted positions about the axis at right angles to the tilting axis.

In the embodiment shown, a primary linkage member 1 in the form of a plate is hinged at 2 to one side of the cabinet 3 in door fashion and embodies a pair of cheeks 4 in intimate contact or close together side-by-side relation. Centrally in the height of this member 1 and at the end opposite the hinge 2 projecting ear cheeks 4' are spaced apart and receive between them a lug portion 5 of a secondary linkage member 6. The lug is fulcrumed on a horizontal pin or bolt 7 which provides the sole connection between the two linkage members 1 and 6. This connection allows the secondary member to tilt with respect to the primary member, means such as the clamping nut 8 which can be adjusted on the pivot 7 to press the ear cheeks 4' together, being provided whereby varying degrees of stiffness or resistance to movement can be obtained as desired. The part of the secondary member which is most distant from its lug 5 is formed as a tube 9 normally vertically disposed. This tube affords passage for a bolt 10 by which the mirror 11 is attached to the secondary linkage member, the bolt passing through holes in lugs 12 provided on the back of the mirror at positions respectively above and below the pivot 7 between primary and secondary members 1, 6; this provides for pivotal movement of the mirror about an axis which is at right angles to the pivot 7 and may be vertical or tilted, as will be understood by reference to Figures 4 and 5, means being provided whereby varying degrees of stiffness or resistance to movement can be obtained as desired. Such means may comprise a clamping nut on the end of the pivot rod 10.

The mirror 11 is provided at the back with a springy finger 14 adapted to clip over an edge of a slot 15 in the primary linkage member to lock the mirror to the linkage automatically when it is brought to a position parallel and close thereto as shown in Figure 3. When the parts are thus locked together the mirror and linkage swing bodily as a unit to give the effect of an orthodox hinged door. The finger clip can be readily released when desired to enable the mirror to be swung to a required angle with respect to the linkage. Thus, if so desired, the mirror can be tilted by relative movement of the primary and secondary linkage members about their point 7 of interconnection.

Each of the lugs 12 provided on the back of the mirror has a back edge 16 which merges by curves into side edges 17 of said lug, these curves being intended to serve as cam devices. The pivot bolt 10 which connects the mirror to the secondary linkage member is nearer to the back edge 16 of the lug than to one of the side edges, the same applying to each lug. Thus, when the mirror is turned with respect to the linkage to such a position that the back edges 16 of the lugs 12 are towards said linkage, spaces exist between said lugs and the primary linkage member 1, which will allow the mirror to be tilted up or down, whereas when the mirror is brought alongside the linkage to cause a side of each lug to face the outer edge of the primary linkage member, the lug comes close to said member. Studs 18 are provided on the outer edge of the primary linkage member 1 at positions to abut the cam edges 16, 17 of the mirror lugs, and the arrangement is such that if the mirror has been in a tilted position and is swung back alongside the linkage, the cam-like curve 16, 17 of one of the lugs will abut one of the studs, and as the mirror is turned it will be pushed back by said stud since when the mirror is in its final position, i. e. the parallel position alongside the linkage there is no clearance between the studs 18 of the primary linkage member and the respective mirror lug 12. Thus in this position at which the lock 14, 15 is operative to connect mirror 11 to primary linkage 1, the studs 18 engage the side edges 17 of the lug cam surfaces 16, 17 as will be seen in Figure 1, and in this way the outer linkage member 6, and thus the mirror 11, becomes properly centralised and the mirror therefore takes up a correct position for use and operation as a door. Each of the studs 18 is adjustable as to its length of projection from the outer edge of the primary linkage member so as to ensure proper engagement with the cam surfaces for ensuring the centralising action. For instance, each stud may be freely fitted in a tubular casing formed by shaping the cheeks of said linkage member, the stud 18 having a screwed shank engaged by a circular milled-edge nut 19 projecting through and located by openings 20 formed in the said tubular casing.

I claim:

1. In a support, the combination, comprising, a cabinet having a rectangular vertical opening, a primary linkage member hinged to the cabinet adjacent the opening to swing about a vertical axis, a secondary linkage member pivoted to the primary member about a horizontal axis, a mirror pivoted to the second member about an axis lying in a vertical plane, releasable interengaging means on the first member and mirror preventing pivoting of the second member on the first member, a pair of substantially vertically aligned adjustable studs on the primary member, one on either side of the horizontal pivot for the secondary member and a pair of cams extending at right angles to the mirror pivot axis and spaced a distance equal to the spacing of the studs each engaging a stud and rigid with the back of the mirror, the cams having a central edge parallel to the mirror and merging into two side-edges perpendicular to the mirror, the central edge being closer to the mirror pivot axis than the side edges whereby the cams in the final turning of the mirror about its pivot axis to close the cabinet opening by the mirror, center the mirror about the pivot axis of the secondary linkage member on the primary member despite the last named pivot axis being approximately at right angles to the plane of the mirror.

2. The combination according to claim 1, wherein the cams are formed on the mounting for the pivot between the secondary member and mirror.

HARRY STANLEY VINEY.

REFERENCES CITED

The following references are of record in the file of this patent:

UNITED STATES PATENTS

| Number | Name | Date |
|---|---|---|
| 1,748,849 | Smidt | Feb. 25, 1930 |
| 1,908,831 | Edward | May 16, 1933 |
| 2,239,487 | Fulton | Apr. 22, 1941 |